Aug. 22, 1967 G. H. ACKER 3,337,003

INLET SIDE PRESSURE STORAGE AND STALL BREAKAWAY MECHANISM FOR SINGLE LINE PROGRESSIVE FEEDER MANIFOLD

Filed Jan. 18, 1965 3 Sheets-Sheet 1

Fig. I

INVENTOR.
GEORGE H. ACKER
BY
Schramm, Kramer & Sturges
ATTORNEYS.

INVENTOR.
GEORGE H. ACKER
BY Schramm, Kramer & Sturges
ATTORNEYS.

INVENTOR.
GEORGE H. ACKER
BY
Schramm, Kramer & Sturges
ATTORNEYS.

United States Patent Office 3,337,003

Patented Aug. 22, 1967

3,337,003

INLET SIDE PRESSURE STORAGE AND STALL BREAKAWAY MECHANISM FOR SINGLE LINE PROGRESSIVE FEEDER MANIFOLD

George H. Acker, Shaker Heights, Ohio, assignor to Eaton Manufacturing Co., a corporation of Ohio Filed Jan. 18, 1965, Ser. No. 426,108
2 Claims. (Cl. 184—7)

This invention relates to lubricating manifolds and concerns particularly arrangements for avoiding piston back-up and piston stall in cylinder and piston and piston type valves.

In centralized lubricating systems of the single line "cascading" type, the major operating difficulty has been that under certain conditions the valve pistons in a lubricating valve manifold used in such systems become stalled in mid-travel position and make the manifold inoperative.

The two principal causes of mid-travel piston stalling are backflow to the valve manifolds from the discharge lines leading to the lubrication points served and incomplete valve piston travel at the time of system shut-down due to diminishing flow from the inlet supply line.

It is accordingly an object of the invention to overcome these difficulties and provide dependable operation of valves of the cylinder and piston type.

Some of the problems of centralized lubrication systems with regard to backflow and consequent piston drift result from the fact that many of the machine elements to be lubricated by such a lubricating system offer substantial resistance to the injection of the lubricant and require high injection pressures (valve discharge pressures) to accomplish this. On the other hand, some of the machine elements to be lubricated may also require little or no injection pressure. It is not at all unusual to find that a lubricating valve manifold may be required to serve machine elements with injection pressure requirements approaching both of these extremes.

It must be further appreciated that all lubricants contain some measure of entrapped air, and some degree of resilience under pressure, as do the conduit materials employed to conduct the lubricants. Such resilience in a discharge line leading from a valve discharge outlet to a machine element requiring the high injection pressure exerts a residual pressure that may be slightly less than the machine element injection pressure, and that tends to produce a backflow to the valve element. As long as the valve inlet pressure is sufficiently in excess of such back pressure, no backflow can result. However, should the inlet pressure fall significantly, backflow with attendant backward drift of the pistons can result unless precautions are taken to prevent it. This has customarily been accomplished by the application of check valves designed to permit outflow only at the valve discharge outlets, but this is not always fully effective.

Check valves are rendered more or less ineffective when foreign particles become lodged in their seating areas, preventing proper closing; and, where the valve manifolds are attached to strongly vibrating machinery or machinery which vibrates frequently, inertial forces may momentarily disrupt the seating of the check valves and eventually result in pitting fatigue of the check valve elements. Thus check valves therefore cannot be counted fully dependable.

In a valve manifold serving machine elements of widely varied injection pressure requirements, particularly where the inlet flow rate is low—a rather common circumstance, since flow rate is often used as a means of timing the cycle frequency of lubricating system operation—the fluid inlet pressure is not constant. The pump supplying lubricant to the inlet conduit may be capable of developing high pressure, and must be capable of overcoming the injection pressures encountered, but in reality it will develop no greater pressure than is required of it to overcome the resistance to fluid flow.

Thus, while one of the manifold valves is discharging against a high injection pressure resistance, the fluid inlet pressure is necessarily high. The next valve or two downstream may encounter light discharge resistance, and the inlet pressure will therefore tend to drop, sometimes to a value significantly below the back pressure of the upstream valve. At that instant any leakage past the discharge check valve will produce backup of such upstream valve piston—possibly enough to put that piston in a centered position which, under certain circumstances may render the manifold inoperative .

There is a further hazard that, even though the discharge check valves may be funtioning perfectly, the resilience of the air entrapped in the manifold itself may cause piston drift under favorable inlet pressures. Compression of the lubricant within the valve passages favors consolidation of the minute lubricant-borne air particles. It will be apparent that in any position in which such a manifold may be mounted, there will be locations within the various passages that are uppermost, in which the air will tend to collect in pockets that in effect become expansion chambers of relatively substantial resilience. Unfortunately, the greatest volumetric capacity of the manifold passages, and the generally uppermost, is in the valve discharge passages, in which resilience tends to backup the valve pistons and favor stalling.

For overcoming such expansion effect problems in accordance with the invention I "fight fire with fire" by increasing the expansion resilience of the valve inlet passages. An expansion chamber is provided within one of the manifold end blocks, preferably but not necessarily the inlet end block or in a separate block. The inlet to the manifold is connected to one end of this chamber and the inlet passage or passages leading to the valves themselves are connected to the chamber at some removed point to provide a flow through the chamber, avoiding a stagnant pocket that would favor soap separation from a grease lubricant.

By virtue of air entrapment, such a chamber may acquire the desired resilience without supplementation, or it may be augmented by a suitably located air bell, spring and piston, or other device offering contraction or expansion of fluid volume with varying pressure.

The anti-stalling device or stall breaking device provided in accordance with the invention consists essentially of a bypass valve of the piston slide valve type, normally restrained from movement by a compression spring of such stiffness that fluid pressures somewhat in excess of the operating inlet pressure requirements of the manifold are sufficient to compress it materially further. The spring is so proportioned that, under further compressive force created by rising inlet pressure of a stalled valve, fluid under pressure is ported to one end chamber of an adjacent measuring valve which is on stall. In this manner the ports of the valve in which the stall has been broken are opened and normal operation of successive valves is resumed.

A better understanding of the invention will be afforded by the following detailed description considered in conjunction with the accompanying drawings in which:

FIG. 1 is a schematic diagram of the blocks and passageways in an embodiment of the invention for showing the directions and paths of flow of lubricant when the invention is used in conjunction with a lubricant system of the type disclosed in United States Patent No. 2,834,433, this diagram of FIG. 1 not being a strictly sectional view since all the passages are shown as if projected on to the same plane;

Like reference characters are utilized throughout the drawing to designate like parts.

Figure 1:
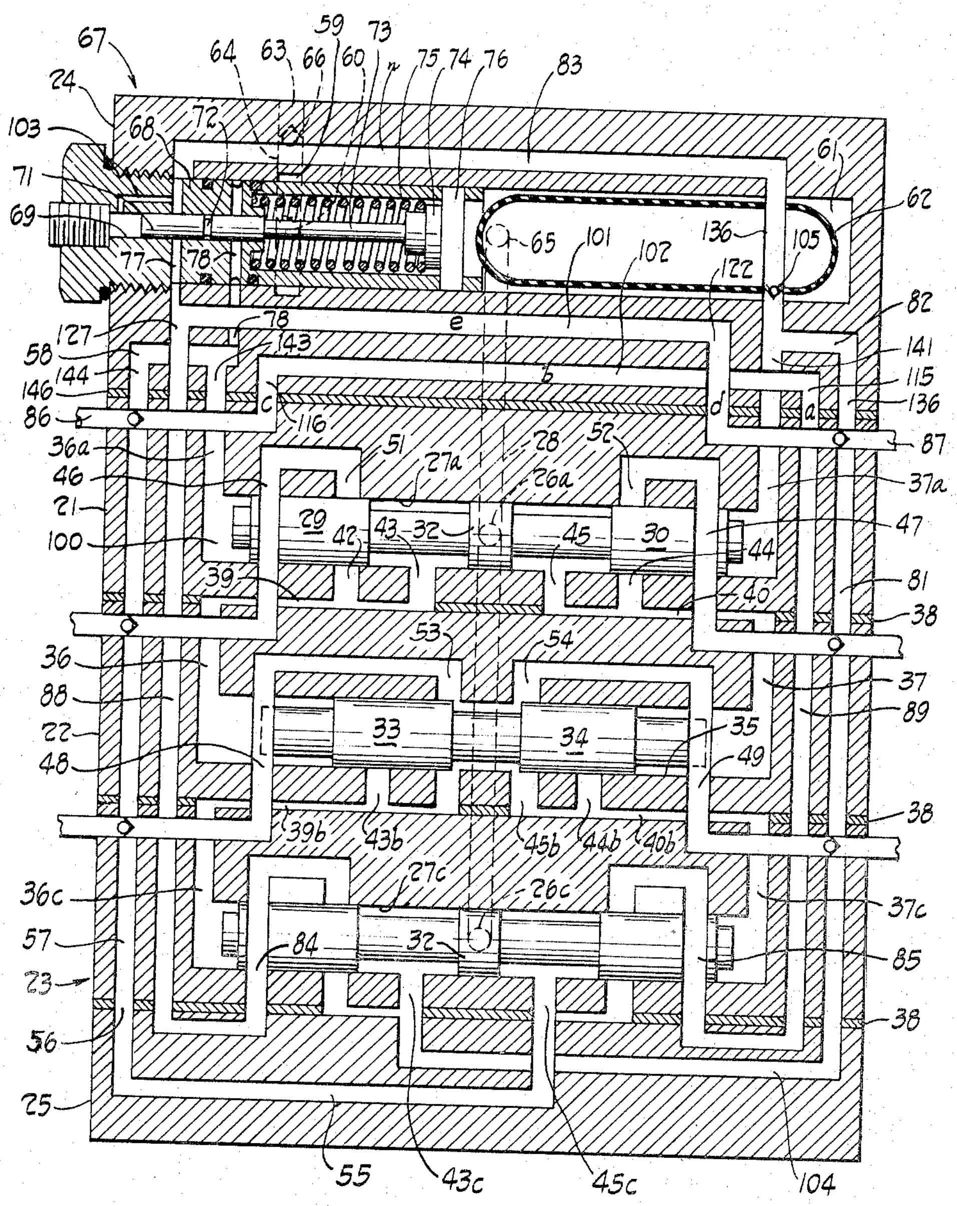

Referring to the schematic diagram of FIG. 1, it will be observed that the single line progressive manifold there shown has valve blocks 21, 22 and 23 containing valve units. The invention is not limited to the use of separate blocks nor to the use of end blocks separate from valve blocks although this is a manufacturing convenience and increases the versatility of the apparatus. In the apparatus shown in FIG. 1 there is a special inlet block 24 including a mechanism in accordance with the invention for avoiding piston drift and stall and there is an end block 25. In the arrangement shown the end block 25 serves merely for providing crossovers and return connections from the last valve block 23 back to the first valve block 21 through the inlet block 24. However, the invention is not limited to this arrangement and does not exclude including features of the inlet block 24 also within the end block 25.

Since the present invention does not relate to the valve blocks themselves, only three valve blocks 21, 22 and 23 have been shown for the sake of illustration, although it will be understood that depending upon the number of points to be supplied with lubricant a greater number of valve blocks may be included and additional 2-landed valve blocks such as the valve block 22 may be employed. Each of the valve blocks employing multi-landed pistons includes an inlet port 26 in a cylinder 27 all of the inlet ports 26 being connected to an inlet passageway 28. For convenience the suffixes *a*, *b* and *c* are employed in connection with the reference numerals of the parts of the valve units 21, 22 and 23, respectively, to distinguish those of one valve unit from another.

The pistons in the multi-landed valve units 21 and 23 have end lands 29 and 30 and either one or two center lands depending upon whether it is desired to divert the inflow from the inlet ports 26 in one direction or the other. For the sake of illustration, multi-landed pistons have been shown with each having a single center land 32. In this manner, end chambers are formed in each cylinder 27 between the end lands 29 and 30 and the respective ends of the cylinders. Likewise, intermediate chambers are formed; one between the end land 29 and the center land or lands and the other between the end land 30 and the center land or lands.

If desired, all of the valve units may be of the multi-landed type although one or more 2-landed valve units such as the valve unit 22 may be used in conjunction with two or more multi-landed valve units. In the 2-landed valve units, if used, each piston comprises a pair of lands 33 and 34 separated from each other to form a central chamber in a cylinder 35 and also a pair of end chambers.

For each valve unit, whether of the 2-landed or multi-landed type, there is a pair of transfer passageways 36 and 37, each leading from an end chamber of one cylinder to ports in another cylinder. For convenience in manufacturing and assembly and versatility in making up manifolds of any desired number of valve units, separating spacers or gaskets 38 are employed between valve blocks with slots 39 and 40 which serve as continuations of the transfer passageways 36 and 37, respectively, and communicate with ports in an adjacent cylinder. Communicating with the slot 39 are outward and inward ports 42 and 43 and communicating with the slots 40 are outward and inward ports 44 and 45.

For each cylinder there is also an outlet passage. In the case of the multi-landed cylinders the outlet passages comprise passages 46 and 47. In the case of the 2-landed valve units the outlet passages comprise passages 48 and 49. Each outlet passage communicates with its cylinder through an outlet port.

In the case of the outlet passages 46 and 47 from the multi-landed valve units, the outlet ports 51 and 52 are opposite ports 42 and 44 nearer the ends of the cylinder so as to cooperate therewith and with the transfer passageway 36 and 37, through slots 39 and 40, respectively. On the other hand, in the case of the 2-landed valve units such as the valve unit 22, the outlet passages 48 and 49 communicate with outlet ports 53 and 54, which are opposite ports **43*b* and 45*b* nearer the center of the cylinder and cooperate therewith and the adjacent transfer passageway slots 39*b* and 40*b***, respectively.

In the operation of a manifold including the elements thus far described, assuming normal operation and no hang-up or valve drift, the lubricant enters one of the inlet ports such as the port **26*a* from the inlet passageway 28 and the pistons are moved back and forth in continuous succession discharging lubricant in succession from the outlet passages such as the passages 46 and 48, 47 and 49**. However, with all of the pistons stalled on dead center in the position illustrated in FIG. 1, all of the inlet ports are blocked and no action can take place.

If the operation had been normal with each piston or at least one of the multi-landed pistons at one end or the other of its cylinder, the operation would have been as follows. For example, assuming that in the valve unit 21 the piston had been at the left, the center land 32 would have uncovered the inlet port **26*a*. This would have permitted lubricant from the inlet passageway 28 to flow into an intermediate chamber in the cylinder 27 out through port 45, slot 40, transfer passageway 37 to the right hand end chamber of the cylinder 35 pushing its piston to the left, expelling lubricant from the left hand end chamber through the transfer passageway 36, the slot 39, into the port 42 (bearing in mind that it has been assumed that the piston in unit 21 is to the left with the land 29 uncovering the ports 42 and 51), thence through ports 42 and 51 across an intermediate chamber in the cylinder 27 and out through the outlet passageway 46**.

When the piston 33–34 was moved to the left, the land 34 also uncovered a port **44*b* permitting the lubricant to continue from the transfer passageway 37 on to the right hand end chamber of the valve unit 23 through the port 44*b*, the slot 40*b*, transfer passageway 37*c* to the right hand end chamber of the cylinder 27*c*, causing the multi-landed piston to move to the left and expel lubricant through transfer passage 36*c*, slot 39*b*, port 43*b*, central chamber in cylinder 35, port 53 and outlet passageway 48**.

Movement of the piston in the valve unit 23 to the left would also open inlet port **26*c* and permit operation to take place as before, except that in this case the unit 23** being the last in the series the connection is back to the upper unit 21. Lubricant from the inlet passageway 28 then enters the right hand intermediate chamber of the cylinder 27c from the port 26c passing through port 45c, return passageway 55 through transfer openings 56 in spacer gaskets and passageways 57 in blocks, a return passageway 58 in the inlet block 24 and through the transfer passageway 36a to the left end chamber of the cylinder 27 of the uppermost valve unit 21 forcing its piston to the right. Thereupon the same operation as previously described takes place under normal conditions with all the pistons moving to the right instead of to the left after which the reverse operation takes place again.

The foregoing described operation does not constitute a part of the present invention but is explained in order to show how the special end blocks provided in accordance with the invention serve to enable normal operation to be achieved even if the piston should become stalled or drift to the center position as shown in FIG. 1.

In order to avoid the effect of high back pressure and a poorly functioning outlet check valve causing backward movement of a piston after it has expelled some lubricant into an outlet line, followed by a fall of inlet pressure resulting from low resistance in the outlet of the next acting valve, which prevents the inlet pressure from being high enough to return the piston of the previously acting valve to its proper end position, means are provided for storing inlet pressure in one of the end blocks. Alternatively, if preferred, such pressure storing means may be mounted within a separate block interposed between one of the end blocks and one of the valve blocks or between valve blocks. In the embodiment of the invention illustrated in FIG. 1 such pressure storage means are provided in the inlet end block 24.

The pressure storage means may comprise simply a pressure storage chamber with the entrapped air of inlet fluid constituting the pressure storage, or mechanical storage of pressure may be provided by a chamber with a spring pressed piston, or a compressible element may be provided in a pressure storage chamber. For example, as illustrated in FIG. 1, the inlet blocks 24 is formed with a cavity or chamber 61 containing a bladder 62 enclosing a suitable gas such as nitrogen or ordinary air that will be under pressure. Consequently, when lubricating fluid is supplied to the chamber 61 under pressure from an inlet port 63 through an inlet passageway 64, the bladder 62 and the pressurized gas contained therein will be compressed for the storage of potential energy available for the maintenance of pressure in the inlet passageways 64 and 28. The passage 64 leads to the interior of the chamber 61 and there is an outlet 65 from the chamber 61 connected to the inlet passageway 28 for the valves 21, 22 and 23. Thus, lubricant flow takes place through the chamber 61 to the distributing valves and avoids the formation of a stagnant pocket which would favor soap separation from a grease lubricant. An inlet check valve 66 is provided at the manifold inlet opening 63.

Dissipation of stored energy in chamber 61 can occur at shut-down of the system leaving the manifold in a potentially stalled condition. To break up any stall that should occur, an alternative set of passageways is provided for bypassing a stalled valve and applying actuating pressure to one of the feeder valves controlled by the stalled valve. In the embodiment illustrated this pressure is applied to the feeder valve 21. Mounted within one end of the chamber 62 is a spring-biased, normally-closed valve 67 for controlling two passageways. The valve 67 is of the sliding piston type comprising a cylinder formed in the block 24, or as shown for the sake of illustration in FIG. 1, a cylindrical valve body 68 mounted in one end of the chamber 61 in fluid-tight relationship thereto and having a bore 69 in which is received a piston or sliding valve plunger 71 with a neck 72. The piston 71 is provided with a stem or shank 73 of smaller diameter carrying a head 74 for holding the end of a compression spring 75 serving to bias the piston 71 in the position illustrated in FIG. 1 against a stop pin or retaining cross pin 76.

There is an annular recess 59 in the cylinder 61 communicating with the inlet 63. The sleeve 68 in turn is cross-drilled to provide a port 60 aligned with the recess 59, for passing incoming lubricant in the bore of the valve body 68 which houses the spring 75. Thus inlet lubricant washes or flushes the spring chamber as inlet lubricant flows around the head 74 and the retaining cross pin 76.

For control by the valve 67, two passages 77 and 78 are formed in the inlet block 24 and the valve body 68. The passages 77 and 78 extend crosswise of the axis of the bore 69 and the piston 71 and are spaced the same distance as the neck 72 and the shoulder at the junction of the piston 71 and its stem 73. The arrangement is such that, when the pressure in the storage chamber 61 rises somewhat above that normal in the operation of the manifold, the reduced diameter neck portion 72 and the reduced diameter stem 73 open the ports formed by the intersection of passageways 77 and 78 with the bore 69.

The passageway 78 is interconnected with the return passageway 58 and the transfer passageway 36a. As shown in the drawing, when the spring 75 is compressed so as to move the shoulder at the end of the stem 73 across the passageway 78, the passageway 78 is opened to the interior of the chamber 61 for admitting inlet pressure through the passageways 78, 58 and 36a to the left hand end chamber 100 of the valve unit 21.

Corresponding to the return passageways 57 and 58 for the transfer passageway 36a are passageways 81 and 82, but at the right hand side of the manifold of FIG. 1, for the transfer passageway 37a. In order to enable these passageways to be opened for releasing lubricant from the right hand end chamber of the cylinder 27, a bypass passageway 83 is formed in the inlet block 24. The bypass passageway 83 taps the return passageway 82 and joins the cross passageway 77.

For returning outlet passageways 84 and 85 of the lowermost valve unit 23 to outlets 86 and 87 of the upper unit 21, controlled by the lowermost unit 23, return passageways 88 and 89 are provided in the valve blocks cooperating with passageways 101 and 102, respectively, formed in the end block 24. Accordingly, the cross passageway 77 of the pressure responsive valve 67 interconnects the bypass passageway 83 to the return outlet passageway 101. In order to prevent entrapment of fluid in the bore 69 to the left of the piston 71 a bleeder passageway 103 is provided, connected to the cross passageway 77.

The chamber 61, when protected against upstream flow by the check valve 66, serves in effect as a pressure flywheel. Before a piston may be moved against a high discharge resisting pressure, a pressure adequate to accomplish this must be established in the expansion chamber 61, and in this process, a substantial volume of fluid must first be forced into the chamber 61 through its inlet 63—enough to make up for the absorbed resilience of the chamber. Thus, energy in effect is stored as in a flywheel. Once a resistance overcoming pressure has been reached in the chamber 61 and its connected passages and cavities, the high resistance valve piston may be moved slightly, but the stored energy in the expansion chamber 61 tends to sustain the inlet pressure from the inlet 63 in the manifold during the operation of downstream valves that may have low discharge resistance.

In this manner, the expansion chamber 61 tends to prevent piston backup to lowered inlet pressures. The chamber 61, however, is not designed to relieve the condition resulting from system stoppage, when relatively slowly diminishing flow rate may die out leaving one or more valve pistons at or too near dead center. Moreover, with ultimate flow cessation via the inlet 63, discharge passage expansion or backflow can cause piston backup.

Although, by increasing the number of valve units in a manifold, the probability is increased that at least one of the valve units will not be in stalling condition, there is a tendency for valve manifolds of this general type heretofore known, under operating conditions, to become subject to complete stall or system stoppage with all of the valve pistons in a manifold centered, cutting off inlet access to all piston end chambers, the condition illustrated in FIG. 1.

Breakage of such a stall takes place in the following manner: the spring 75 is so proportioned that under further compressive force created by the rising inlet pressures of a stalled valve, to which the piston 71 is exposed, outward movement of the piston 71 will eventually be produced, until the smaller diameter stem or shank 73 of the piston 71 permits fluid under inlet pressure access to the cross drilled passageway 78, putting the inlet pressure to the left hand end of the cylinder 27 through the passageways 78, 58 and 36*a*, of the measuring valve 21, which may be on stall.

This end chamber 100 of the cylinder 27*a* is also connected by way of porting of the piston in the valve 23 with a discharge outlet 86 through passageways 58, 57, 55, 45*c*, 85, 89 and 102 (if the piston in the lowermost valve 23 is to the right). However, if such porting is operative, so also will the porting be operative which puts inlet pressure at the opposite end of valve 21 (from inlet passageway 28, port 26*c*, interior of cylinder 27*c*, port 43*c*, a return passageway 104, the transverse return passageway 81, return passageway 82 and transfer passageway 37*a* to the right hand end chamber of the cylinder 27*a*), and there would be no stall. Therefore if the piston in the uppermost valve unit 21 is under stall because of lack of inlet pressure to an end chamber thereof, it is an indication that the lowermost valve 23 must also be under stall.

This obstacle is overcome by the short circuiting of the valving of the lowermost valve 23. A bypass passageway is provided from the right hand end chamber of valve 21, to the discharge connection associated with the right hand end chamber of the valve unit 21. This bypass discharge connection takes place through the transfer passageway 37*a*, the bypass passageway 83, the cross drill passageway 77, around the neck 72 of the piston 71, through the horizontal passageway 101, passageway 122, to the outlet 87, when the piston 71 is forced fully outward under pressure.

In this manner, the piston of the unit 21 is forced off center, and effective movement of that piston automatically and progressively positions all downstream valves to conform, and the inlet pressure reduces to normal, normal operating of the valves having been restored. The lowered inlet pressure permits return of the anti-stall piston 71 to its inward position under the pressure of its spring 75.

This anti-stall mechanism including the slide piston 71 is applicable to any valve manifold known of the general class described. It does not require the use of the expansion chamber 61 shown in FIG. 1. It requires merely that the inward end of the piston 71 be exposed to inlet pressure independent of any lubricating valve cutoff possibility.

It will be observed that in the arrangement as illustrated in FIG. 1, provision is made for inlet flow through the spring chamber to avoid soap formation hazard. Moreover, while the cylinder of this anti-stall mechanism has been drawn in an inserted element of the manifold end block, this is primarily a manufacturing convenience, and the same operational result is obtainable by suitable provision directly in the inlet end block 24. A check valve 105 may, if desired, be provided for preventing backflow into the passage 83 short circuiting the last valve in the manifold. This serves to inhibit soap formation in the passageway 83.

Figure 15:
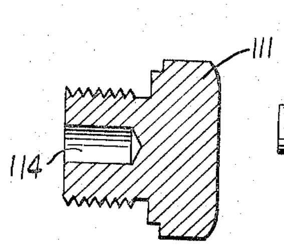
FIG. 15 is a longitudinal sectional view of a plug for the opposite end of the chamber.
Figure 17:
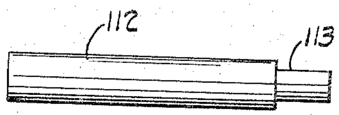
FIG. 17 is a view of a stop pin.

FIGS. 4 to 17 illustrate an alternative construction of the inlet block 24, or of a separate block to be interposed following the inlet block, in which the stored energy of air particles entrapped in inlet fluid is employed instead of the pressurized gas bladder 62 for storing energy of inlet pressure. In this construction there is a bore 106 in a block 107 to serve as the pressure storage chamber 61. The bore 106 has a reduced diameter portion 108 to serve as the cylinder for the piston 71. The left hand end of the cylinder 108 is closed by a threaded plug 109. The right hand end of the bore 106 is closed by a threaded plug 111 (FIG. 15). To avoid the necessity for the cross pin 76 of FIG. 1 for limiting the travel of the piston 71 a stop pin 112 is provided having a reduced diameter portion 113 fitting a bore 114 in the plug 111.

In the block 107, to form the passage 102, a hole is drilled from one end and vertical holes 115 and 116 are drilled from the bottom face 117 of the block 107 intersecting the drilled hole 102. To close the ends of these holes steel balls 118, 119 and 120 are welded in place. In a similar manner the passageway 101 is formed in the block 107 by a hole drilled in from the opposite end of the block with an intersecting vertical hole 122 drilled through perpendicular to the bottom face, and a horizontal hole 123 drilled to intersect the horizontal drilled hole 101. The ends of these holes are likewise closed by steel balls 124, 125 ad 126 welded in place.

To complete the passageway 101, another vertical hole 127 is drilled perpendicular to lower face 117 of the block 107 so as to intersect the inward end of the hole 123. The upper end of this hole is also closed by welded steel ball 128.

The cross drill passage 77 of the pressure responsive valve 67 is designed to communicate with the passageway 101. This is accomplished by drilling an additional horizontal hole 129 in such a position as to intersect both the vertical drilled hole 127 and the cross drilled hole forming passageway 77. The end of this hole is closed by a steel ball 131 welded in place. The cross drilled hole 77 is made long enough so that a diagonal hole 132 may be drilled from an enlarged end of the hollow cylinder 108 intersecting the cross drill 77 to permit bleeding from the left hand end of the cylinder 108.

For connecting the diagonal hole forming the bleeder passage 132 and the cross drilled hole 77 to the outlet bypass 83, a horizontal hole 133 is drilled intersecting a vertical hole 134 drilled perpendicular to the lower face 117 of the block 107 deep enough to intersect the horizontal drilled hole forming the horizontal part of the passageway 83. Intersecting this passageway 83 a horizontal hole 135 is drilled which in turn is intersected by a vertical drilled hole 136 entering from the lower face 117 of the block 107. The drilled holes 135 and 136 form the passageway 82 of FIG. 1. The welded steel closure balls 137, 138 and 139 are provided for the holes 133, 135 and 83.

A vertical drilled hole 141 is provided intersecting the hole 135 for alignment with the transfer passageway 37*a* of the uppermost valve unit 21. In order to enable the cross drilled passageway 78 of the pressure-responsive valve 67 to communicate with the return passageway 58 and the transfer passageway 36*a* a horizontal hole 142 is drilled, intersecting a vertical drilled hole 143, aligned with the passageway 57, and a vertical hole 144 is drilled, aligned with the transfer passageway 36*a*. A connection between the vertical cross passageway 78 and vertical hole 144 is provided by a groove 145 cut in the lower face of the block or by means of a corresponding slot in the uppermost gasket 146. Closures 130 and 140 are provided for the top ends of passages 141 and 143 of the block of FIGS. 4–12 if it is to serve as inlet block as well as pressure chamber block.

Figure 2:
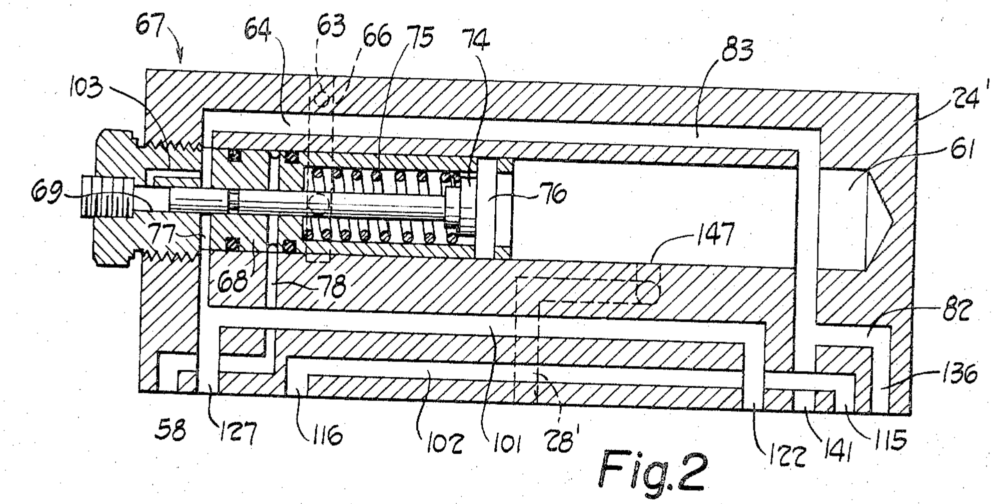
FIG. 2 is a corresponding view of a modified form of an inlet end block for use with the manifold illustrated in FIG. 1.
Figure 3:
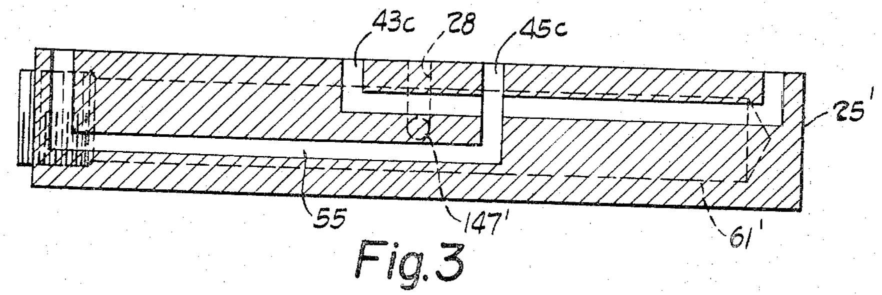
FIG. 3 is a corresponding view of an opposite end block containing a pressure chamber.
Figure 4:
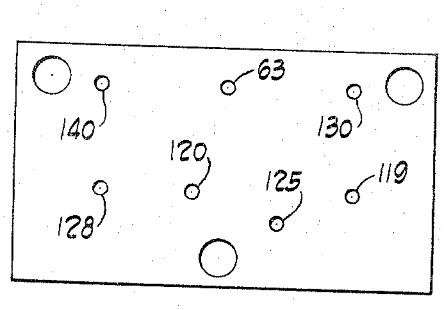
FIG. 4 is a top view of another embodiment of an inlet block and pressure chamber block which may be used in the system of FIG. 1.
Figure 5:
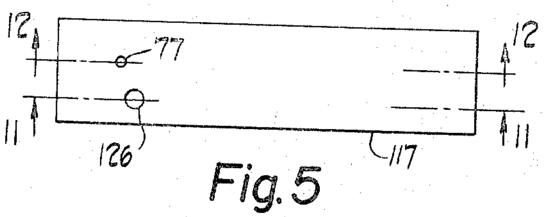
FIG. 5 is a front view of the block of FIG. 4.
Figure 6:
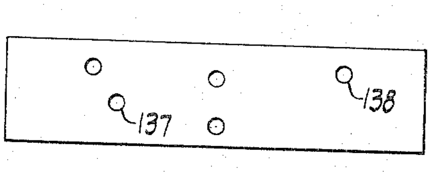
FIG. 6 is a back view of the block of FIG. 4.
Figure 7:
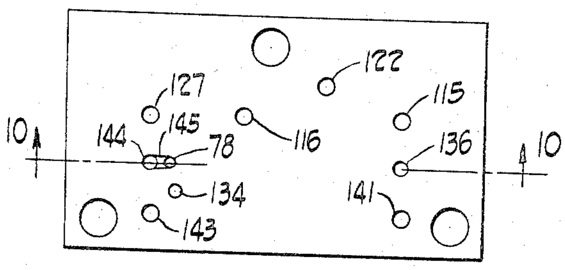
FIG. 7 is a bottom view of the block of FIG. 4.
Figure 8:
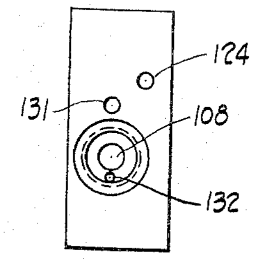
FIGS. 8 and 9 are end views of the block shown in FIGS. 4, 5, 6 and 7.
Figure 9:
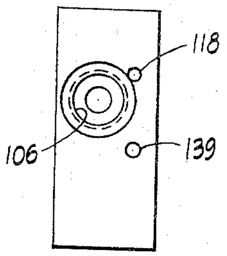
Figure 11:
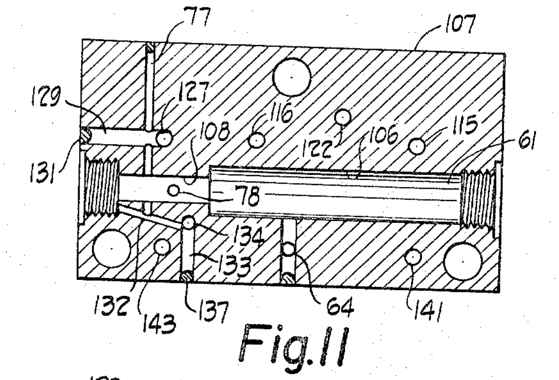
FIG. 11 is a view of a section of the block represented as cut by a plane 11—11 indicated in FIG. 6.
Figure 10:
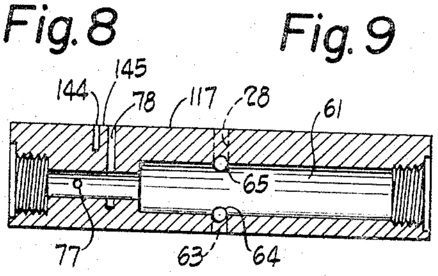
FIG. 10 is a view of a section of the block represented as cut by a plane 10—10 indicated in FIG. 7.
Figure 12:
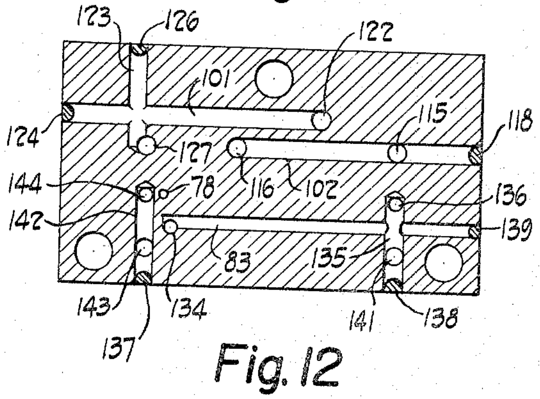
FIG. 12 is a view of a section of the block represented as cut by a plane 12—12 indicated in FIG. 6.
Figure 13:
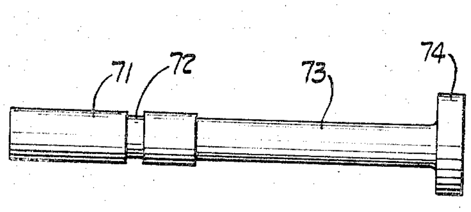
FIG. 13 is a view of the piston employed in the block of FIGS. 4 to 12.
Figure 16:
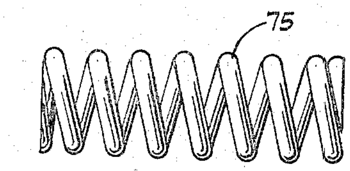
FIG. 16 is a view of a biasing spring for the piston of FIG. 13.
Figure 14:
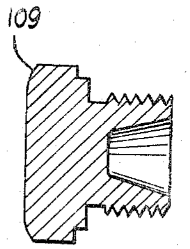
FIG. 14 is a longitudinal sectional view of a plug for the small end of the pressure chamber of the block.

FIGS. 2 and 3 illustrate that essentially the arrangement of FIG. 1 may be employed with a pressure storage chamber 61 in the inlet block 24 utilizing only the stored energy of fluid entrapped compressed air, and a comparable pressure storage chamber 61′ in the end block 25′. Such chambers may be employed in both the inlet and terminal end blocks as shown. In order to permit the manifold to be mounted in different positions, horizontal or vertical and so forth, so as to obtain an air chamber in any position of mounting, the inlet line 28 to the manifold is ported to each pressure storage chamber 61 or 61′ at the center of its air volume through a port 147 or 147′. The ports 147 and 147′ are in such a point that in three mounting positions of the manifold at atmospheric pressure at least half of chamber 61 or 61′ is air filled. This is considered adequate for operation up to 1000 pounds per square inch. For operations at higher pressure, solid centers of rubber or other material with substantially flexible characteristics may be used for substantially filling one or both of the chambers 61 and 61′.

In the modified arrangement of FIGS. 4 to 17 no independent compressible member is provided in the bore 106 forming the pressure storage chamber 61 and the energy stored in air particles entrapped in the lubricant is utilized.

While the invention has been described as embodied in concrete form and as operating in a specific manner in accordance with the provisions of the patent statutes, it should be understood that the invention is not limited thereto, since various modifications will suggest themselves to those skilled in the art without departing from the spirit of the invention.

What is claimed is:

1. In a divisional lubricant feeder of the type comprising a plurality of cylinder and piston feeder valves which act sequentially for discharging lubricant to successive outlets and have pistons in cylinders with sequentially opening ports for successive passageways connected to successive outlets, in combination with a lubricant inlet passageway in one of the cylinder and piston feeder valves, means for avoiding incorrect movement of such pistons upon occurrence of back pressure comprising block means containing a pressure-storage chamber connected to the inlet passageway, and means for overcoming the effect of faulty positioning of a feeder-valve piston comprising an auxiliary valve piston in a cylinder formed in said block means, said auxiliary piston being adapted to move in said latter cylinder with an inlet connection to the pressure storage chamber, the cylinder for said auxiliary valve piston having a port adapted to be open to said inlet, a bypass line connecting said port to one end of one of the feeder-valve cylinder for bypassing pressure from the input line thereto, said auxiliary piston cylinder being formed with a second port with a bypass line controlled by said second port between the other end of the feeder-valve cylinder and one of the outlets, thus the bypass line from the first port short circuits the valving of the feeder-valve piston which normally controls the valve in question to enable the feeder valve in question to be moved from its stalled position, the bypass line from the second port serving to open the opposite cylinder end of the feeder valve in question to connect it to its outlet passageway.

2. In a divisional lubricant feeder of the type comprising a plurality of cascaded cylinder and piston feeder valves in which there are cylinders with first and second end chambers, each end chamber alternately serving to receive fluid under pressure to move the piston in the opposite direction and to discharge lubricant through an outlet when pressure is applied to the opposite end of the piston as it executes a return stroke and each piston serves as a valve for controlling ports of another cylinder for connecting inlets and outlets to the cylinder alternately, the combination, with inlet passage means and one of the cylinder and piston valves, of an energy storage and stall breakaway unit comprising block means having a chamber therein with a connection to said inlet passageway means, a compressible member in said chamber enabling lubricant under pressure to be stored in said chamber by compression of said compressible member, a normally closed pressure responsive valve having first and second normally closed lines controlled thereby, said pressure responsive valve being exposed to the pressure in said energy storage chamber and biased to maintain said valve lines closed until the pressure exceeds a value greater than the value normally required to operate the cascaded valves, passageway forming means between said chamber containing the compressible member and the first end chamber of said one of the cylinder and piston valve units, the first controlled line of said pressure responsive valve being interposed therein for enabling inlet pressure to be applied directly to said cylinder and piston valve unit upon rise of inlet pressure above said predetermined value, and a bypass line between the second end chamber of said one of the cylinder and piston valve units and its outlet line, said bypass including the second controlled line of said pressure responsive valve whereby lubricant in said second end chamber may be discharged.

References Cited

FOREIGN PATENTS

| | | |
|---|---|---|
| 1,346,270 | 11/1963 | France. |
| 524,403 | 8/1940 | Great Britain. |
| 845,015 | 8/1960 | Great Britain. |

LAVERNE D. GEIGER, *Primary Examiner.*

H. BELL, *Assistant Examiner.*